Oct. 15, 1957     A. J. GALE     2,810,077

COMPACT X-RAY GENERATOR

Filed March 2, 1956     2 Sheets-Sheet 1

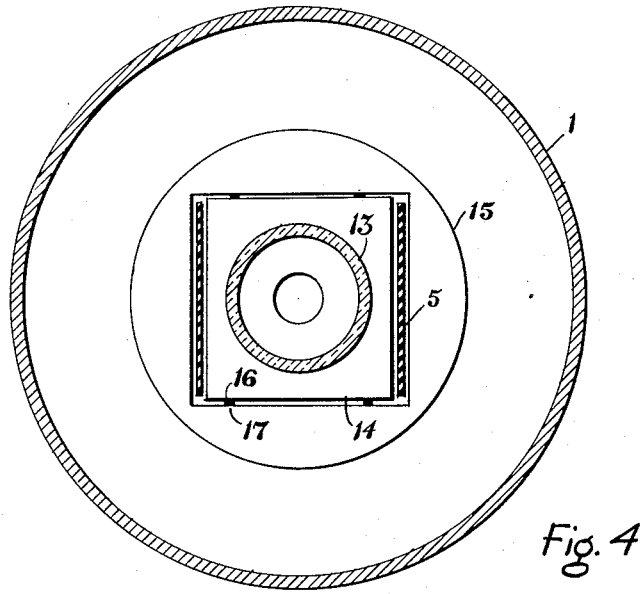
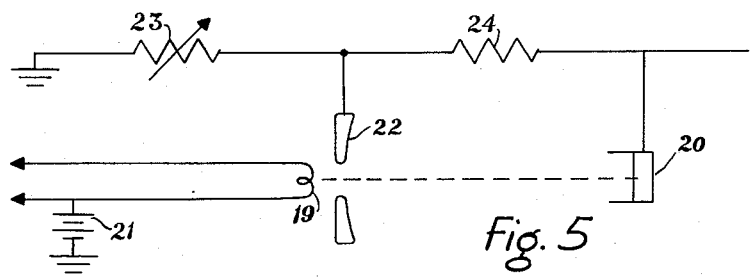
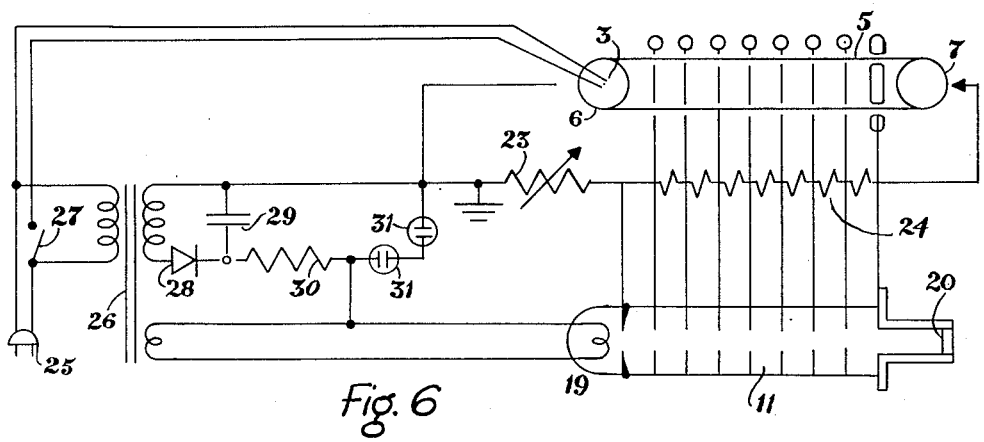

United States Patent Office 2,810,077
Patented Oct. 15, 1957

2,810,077

COMPACT X-RAY GENERATOR

Alfred J. Gale, Lexington, Mass., assignor to High Voltage Engineering Corporation, Burlington, Mass., a corporation of Massachusetts Application March 2, 1956, Serial No. 569,079

7 Claims. (Cl. 250—93)

This invention relates to moderate-voltage X-ray generators in the voltage range between $10^5$ and $10^6$ volts, and in particular to a moderate-voltage X-ray generator of novel design adapted to portable use in industrial radiography. The invention utilizes an electrostatic belt-type generator as the voltage source and obtains maximum simplicity by having the X-ray target at the voltage of the high-voltage terminal, a self-charged generator, and a voltage control system based on a space charge limited beam current. The invention achieves minimum size and weight by incorporating the X-ray tube within the belt run of the electrostatic voltage generator and by using an integral tube and column structure.

Portable moderate-voltage X-ray generators are particularly useful in the field of industrial radiography, such as in the spot checking of welds in one-inch thick storage tanks, etc. Assuming that the voltage of the generator is sufficient to provide adequate penetration of the object to be radiographed, the principal aim in improving generator operation is the reduction of the exposure time necessary to take the desired radiograph. The exposure time is inversely proportional to the X-ray power, and the X-ray power is proportional to the electron beam current in the X-ray tube and to the cube of the voltage. In general, for apparatus of comparable size and weight, the higher voltage obtainable with an electrostatic belt-type generator offsets the lower current obtainable therewith as compared with A. C. machines. Moreover, the constant potential of the electrostatic belt-type generator gives it at least a 50% advantage over an A. C. generator whose peak voltage equals that of the electrostatic generator. Thus, for example, in taking a radiograph of steel one inch thick, a 10-microampere 250-kilovolt-peak A. C. machine will do the job of a 1-milliampere 150-kilovolt-peak A. C. machine, and the use of a 10-microampere 250-kilovolt D. C. machine gives an additional advantage of at least 50%.

In the drawings:

Fig. 4 is a cross section taken along the line 4—4 of Fig. 3;

Fig. 5 is a circuit diagram illustrating a possible circuit for controlling exposure time and stabilizing the voltage of the X-ray generator of Fig. 1; and Fig. 6 is a circuit diagram illustrating a simple circuit for controlling the operation of the X-ray generator of Fig. 1.

Figures 1, 2:
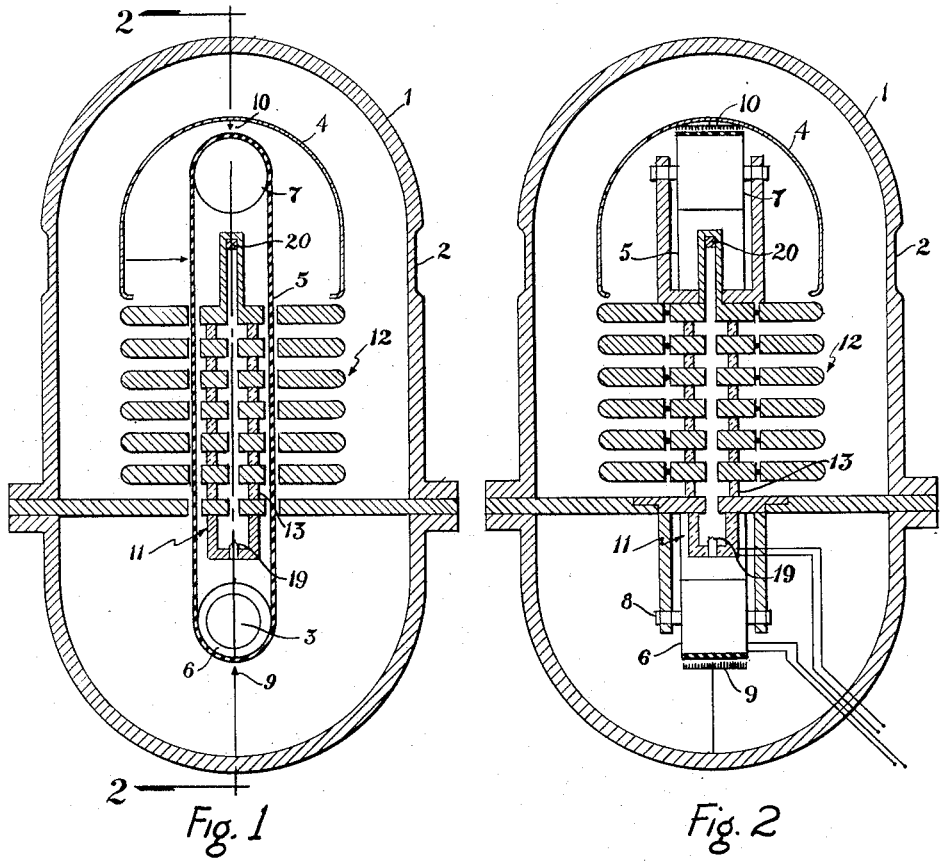
Fig. 1 is a vertical central section of one form of X-ray generator embodying the principles of the invention.
Fig. 2 is a cross section taken along the line 2—2 of Fig. 1.
Figure 3:
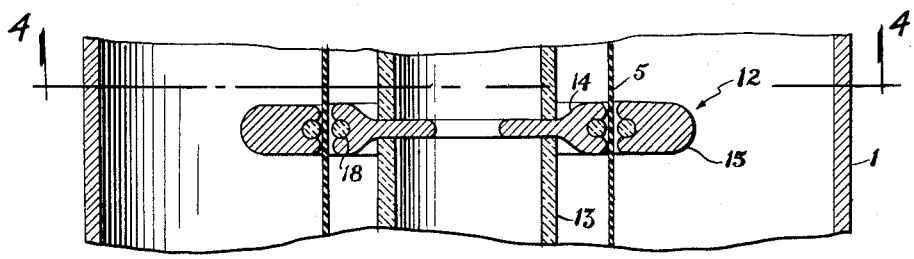
Fig. 3 is an enlarged view showing in detail a portion of the sectional view of Fig. 1.

Referring to the drawings, and first to Figs. 1, 2, 3 and 4 thereof, the entire X-ray generator, constructed in accordance with the invention, is preferably enclosed within a housing 1 of generally cylindrical configuration. In general, the housing 1 will be filled with an insulating gas under pressure, and therefore must be strong enough for this purpose. Only the circular strip 2 which surrounds the target area need be permeable to X-rays, and this strip 2 may be, but need not be, thinner than the rest of the housing 1. When the housing 1 is filled with a suitable insulating gas under pressure, a 250-kv. X-ray generator may be housed within a housing 1 of length of about 15 to 18 inches and having a circumference of about 8 inches, if the generator is constructed in accordance with the invention. The housing 1 is of conductive material and is at ground potential.

In accordance with the invention, the electron-accelerating voltage is generated by an improved form of electrostatic belt-type generator. The principle of operation of an electrostatic belt-type generator is well known. Such a generator comprises essentially a hollow electrode on which electric charge is accumulated, an insulating belt which carries electric charge from ground to the interior of the hollow electrode, means for depositing electric charge on the belt at ground, and means for transferring electric charge from the belt to the hollow electrode. The mechanical energy used to drive the belt is thus converted into the potential energy of the accumulation of electric charge on the hollow electrode, and this potential energy is subsequently converted into the kinetic energy of a current flow. This energy conversion is very efficient. Thus, in the apparatus of Figs. 1, 2, 3 and 4, more than 70% of the mechanical energy supplied by a motor 3 is converted into the kinetic energy of a current flow, so that a motor supplying $\frac{1}{200}$ H. P., or 3.73 watts, enables the generator to deliver 20 $\mu a.$ at 150 kv., or 3 watts.

Referring to Figs. 1, 2, 3 and 4, electric charge is carried to a hollow electrode 4 on an endless belt 5 of insulating material, which is supported between two pulleys 6, 7. The lower pulley 6 is rotated by means of the motor 3; the motor 3 is so constructed that its shaft 8 remains stationary while its casing, comprising the lower pulley 6, rotates. The upper pulley 7 is mounted within the hollow electrode 4.

A wire screen 9 is supported, at ground potential, so that one edge thereof barely touches the surface of the belt 5 as the belt 5 passes around the lower pulley 6. A second wire screen 10 is supported within and electrically connected to the hollow electrode 4, so that one edge of the wire screen 10 barely touches the surface of the belt 5, as the belt 5 passes around the upper pulley 7.

The electrostatic belt-type generator, as illustrated, in its preferred form, is self-excited, with the charging of the belt 5 being initiated by friction between the belt 5 and at least one of the pulleys 6, 7. For excitation purposes, only the outer surface of at least one of the pulleys 6, 7 need be of insulating material, and the other pulley may comprise a conductive member. However, preferably the outer surfaces of both pulleys 6, 7 are of insulating material. The choice of insulating materials must be such that the insulating material of the lower pulley 6, the belt 5, and the upper pulley 7 follow an ascending sequence in the tribo-electric series if a positive potential is to be generated at the hollow electrode 4, and a descending sequence in the triboelectric series if a negative potential is to be generated at the hollow electrode 4. In the preferred form of the invention, shown in Figs. 1, 2, 3 and 4, a positive potential is generated at the hollow electrode 4.

It is not necessary that the electrostatic belt-type generator be self-excited, and an external belt-charging power supply may be employed. However, where a compact design is desired, as in the case of a portable X-ray generator for industrial radiography, it is advantageous to eliminate the additional power supply which is required to charge the belt in a non-self-excited generator.

Since tube potentials approximating (and probably in excess of) 250 kv. are required, potential division is necessary. High currents and small physical size will call for high belt charge densities and therefore for close gradient control. A subdivided column is, of course, required. In accordance with the invention, the acceleration tube 11 is made integral with the column, as shown in Figs. 1, 2, 3 and 4. Thus, even though voltage subdivision is required on both the tube and the column, only a single set of equipotential planes is required. Moreover, in the construction provided by the invention, column diameter may be minimized even though the tube is located within the column.

Since the acceleration tube 11 also functions as the column, it serves to support the high-voltage portions of the apparatus and also to insulate such high-voltage portions from ground. The tube 11 is constructed of a series of conductive members 12 spaced from one another by insulating members 13. Each conductive member 12 comprises two parts: a central rectangular block 14 and a circular block 15 having a central rectangular aperture into which the rectangular block 14 is fitted. Spring-loaded balls 16 in the ends of the rectangular block 14 fit into corresponding sockets 17 in the circular block 15, so as to hold the conductive member 12 together as a unit. The central rectangular aperture in the circular block 15 is wider than the rectangular block 14, so that space is provided for the passage of the two runs of the belt 5. Insulating rods or belt spacers 18 prevent the belt 5 from coming into direct electrical contact with the conductive members 12.

The conductive members 12 are spaced from one another by insulating members 13 which are cemented to the rectangular blocks 14. Both the insulating members 13 and the rectangular blocks 14 are provided with central apertures to permit passage of the electron beam up the tube 11. The entire series of the insulating members 13 and the rectangular blocks 14 thus form a rigid unit, while the circular blocks 15, though held in a place by the spring-loaded balls 16, are easily removable.

The acceleration tube 11 is provided with a cathode 19 and an X-ray target 20. In accordance with the invention, the target 20 is mounted at the high-potential end of the tube 11, within the hollow electrode 4, while the cathode 19 is at the grounded end of the tube 11. In this way it is possible to eliminate the terminal alternator which would otherwise represent a difficult design problem and which would be an expensive component to produce. The target 20 which is situated within the hollow electrode 4 will produce X-rays which must produce radiographs through the additional thickness of the hollow electrode 4 and the housing 1. Therefore, the hollow electrode 4 and the circular strip 2 of the housing 1 should be kept free of defects and as thin as practicable. At the moderate voltages for which the X-ray generator of the invention is designed, the amount of X-radiation emitted from the target 20 in directions transverse to the longitudinal axis of the tube 11 is large relative to the amount of X-radiation produced in the direction of travel of the electron beam. As a result, the upper pulley 7 presents negligible interference with the useful X-ray output.

Since the generator shown is a self-charged unit, it essentially operates at constant current. The tube current must also therefore be essentially constant and the radiograph exposure times must be varied by terminal voltage variation. The circuit for achieving this is shown in the circuit diagram of Fig. 5.

Referring to said Fig. 5, the emitting cathode 19 is held at a fixed positive potential by means of a suitable voltage source 21. For example, in a 250-kilovolt generator, the voltage source 21 might hold the cathode 19 at a potential of about 300 volts positive with respect to ground. A cathode cup 22 of conventional design is connected to ground through a variable resistance 23 and to the target 20, which is at high positive potential, through the resistance 24, which represents the total resistive path between the hollow electrode 4 and the cathode cup 22, and which may comprise the column resistors or corona gaps which are conventionally employed in electrostatic belt-type generators. The leakage current which flows from the hollow electrode 4 to ground through the resistance 24 and 23 causes the cathode cup 22 to assume a positive potential with respect to ground which may be varied by varying the resistance 23. The positive potential of the cathode cup 22 also varies with the voltage of the hollow electrode 4. Thus, for example, upward fluctuations in the voltage of the hollow electrode 4 will increase the current through the resistance 23, which causes the cathode cup 22 to become more positive with respect to the cathode filament 19, which therefore increases the electron-beam current flowing in the acceleration tube 11. This increase in electron-beam current compensates the tendency for the voltage of the hollow electrode 4 to increase. In this manner, the voltage is stabilized by converting voltage fluctuations into current fluctuations; and, since the generator essentially operates at constant current, maximum stability of X-ray output is achieved.

The voltage at which the generator is stabilized may be varied by appropriate adjustment of the variable resistance 23, the resistance 23 being made variable to cover the appropriate voltage range.

The regulation of this type of control depends on the fixed potential applied to the cathode filament 19 by the voltage source 21, and on the mutual conductance of the assembly comprising the filament 19 and the cathode cup 22.

Essential functional controls for a variable voltage fixed current unit are: (1) Voltage regulating potentiometer, such as the variable resistance 23 of Fig. 5. For preset operation this can be integral with the generator. (2) Some form of time delay (the operator himself if he is reliable) to prevent full self-charge occurring before the filament reaches emitting temperature. In addition some form of exposure timer is advisable.

A simple set-up in which the control "console" comprises nothing more than a time switch in the supply cord is indicated in the circuit diagram of Fig. 6. Referring to said Fig. 6, when the plug 25 is inserted in an appropriate outlet, the transformer 26 transmits current to the filament 19, while the time switch 27 prevents the motor 3 from starting until the filament 19 has reached emission temperature. The voltage source 21 for biasing the filament 19 is derived from the transformer 26, of which the output is rectified by a rectifier 28, filtered by the condenser 29 and resistor 30, and maintained at a fixed voltage drop by the neon tubes 31.

Having thus described the principles of the invention, together with an illustrative embodiment thereof, it is to be understood that although specific terms are employed, they are used in a generic and descriptive sense, the scope of the invention being set forth in the following claims.

I claim:

1. An X-ray generator comprising in combination: an electrostatic generator including a high-voltage terminal and a travelling charge-conveying endless belt for carrying electric charge between said high-voltage terminal and ground so as to produce a net positive charge at said high-voltage terminal, and an acceleration tube electrically connected between said high-voltage terminal and ground in such a way that electrons may be accelerated through said tube by the electric field produced by the electric charge accumulated at said high-voltage terminal, said acceleration tube having an electron source at the grounded end thereof and an X-ray target at the high-voltage end thereof.

2. A moderate-voltage X-ray generator comprising in combination: an electrostatic generator including a high-voltage terminal assembly and a traveling charge-conveying endless belt for carrying electric charge between said high-voltage terminal assembly and ground so as to produce a net positive charge at said high-voltage terminal assembly, and an acceleration tube electrically connected between said high-voltage terminal assembly and ground in such a way that electrons may be accelerated through said tube by the electric field produced by the electric charge accumulated at said high-voltage terminal assembly, said acceleration tube having an electron source at the grounded end thereof and an X-ray target at the high-voltage end thereof, and said acceleration tube being mechanically connected between said high-voltage terminal assembly and ground, and within the path traveled by said belt.

3. A moderate-voltage X-ray generator comprising in combination: an electrostatic generator including a high-voltage terminal assembly and a traveling charge-conveying endless belt for carrying electric charge between said high-voltage terminal assembly and ground so as to produce a net positive charge at said high-voltage terminal assembly, and an acceleration tube electrically connected between said high-voltage terminal assembly and ground in such a way that electrons may be accelerated through said tube by the electric field produced by the electric charge accumulated at said high-voltage terminal assembly, said acceleration tube having an electron source at the grounded end thereof and an X-ray target at the high-voltage end thereof, and said acceleration tube being mechanically connected between said high-voltage terminal assembly and ground, and within the path traveled by said belt, in such a way as to provide the sole mechanical support for said high-voltage terminal assembly.

4. A moderate-voltage X-ray generator comprising in combination: an electrostatic generator including a high-voltage terminal assembly and a traveling charge-conveying endless belt for carrying electric charge between said high-voltage terminal assembly and ground so as to produce a net positive charge at said high-voltage terminal assembly, said belt being supported upon two pulleys, one of which is in said high-voltage terminal assembly and the other of which is at ground, said belt and said pulleys being adapted to produce the required electric charge on said belt by virtue of friction between said belt and at least one of said pulleys, and an acceleration tube electrically connected between said high-voltage terminal assembly and ground in such a way that electrons may be accelerated through said tube by the electric field produced by the electric charge accumulated at said high-voltage terminal assembly, said acceleration tube having an electron source at the grounded end thereof and an X-ray target at the high-voltage end thereof, and said acceleration tube being mechanically connected between said high-voltage terminal assembly and ground, and within the path traveled by said belt.

5. In combination with a self-charged electrostatic belt-type generator and an acceleration tube having an electron-emitting filament at one end thereof and an anode at the other end thereof, said acceleration tube being electrically connected to said electrostatic belt-type generator so that electrons emitted by said filament are accelerated toward said anode by the electric field produced by said electrostatic belt-type generator: means for converting fluctuations in the voltage produced by said electrostatic belt-type generator into fluctuations in the electron beam current in said acceleration tube.

6. In combination with a self-charged electrostatic belt-type generator and an acceleration tube having an electron-emitting filament at one end thereof and an anode at the other end thereof, said acceleration tube being electrically connected to said electrostatic belt-type generator so that electrons emitted by said filament are accelerated toward said anode by the electric field produced by said electrostatic belt-type generator: means for heating said filament to a temperature sufficient to produce a space-charge-limited electron beam current, an electrode between said filament and said anode and adapted to control, by virtue of its potential, the electric field in the vicinity of said filament without obstructing said beam, a high-resistance connection between said electrode and said anode, a high-resistance connection between said electrode and said filament, said high-resistance connections permitting a small leakage current to flow therethrough which increases or decreases when the voltage of said electrostatic belt-type generator increases or decreases respectively, said high-resistance connection between said electrode and said filament including a voltage source adapted to bias said filament with respect to said electrode.

7. Apparatus in accordance with claim 6, wherein means is provided for varying the resistance of said high-resistance connection between said electrode and said filament, whereby the voltage at which said electrostatic belt-type generator is stabilized may be controlled.

References Cited in the file of this patent
UNITED STATES PATENTS
2,007,890    Coolidge  ----------------  July 9, 1935